Jan. 24, 1961     D. R. MacFARLANE     2,968,896
METHOD AND APPARATUS FOR GRINDING CAMS
Filed March 9, 1959     2 Sheets-Sheet 1

INVENTOR
D. R. MacFARLANE
BY R. P. Miller
ATTORNEY

Jan. 24, 1961  D. R. MacFARLANE  2,968,896
METHOD AND APPARATUS FOR GRINDING CAMS
Filed March 9, 1959  2 Sheets-Sheet 2
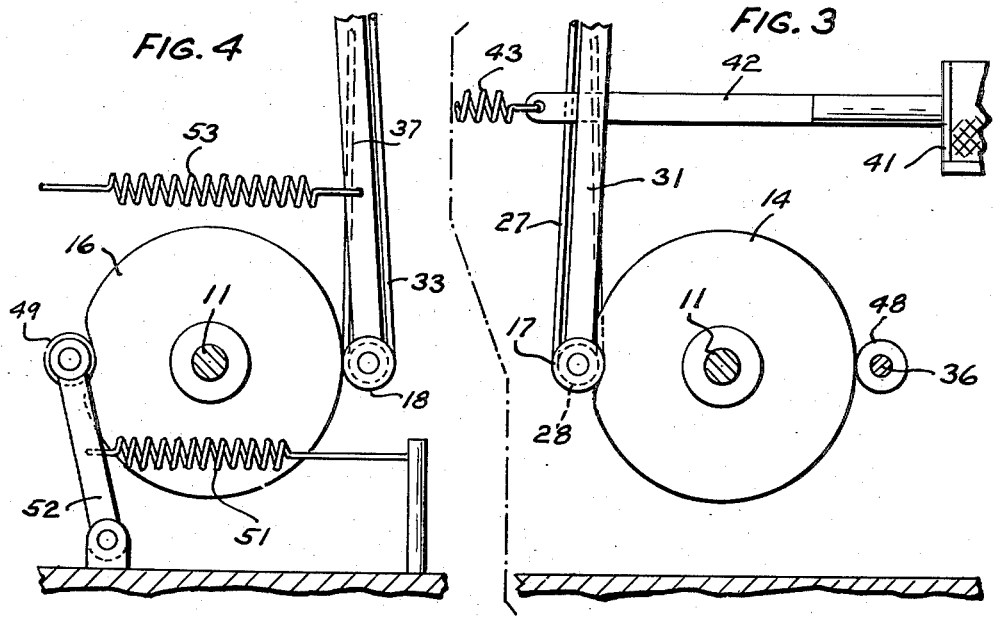
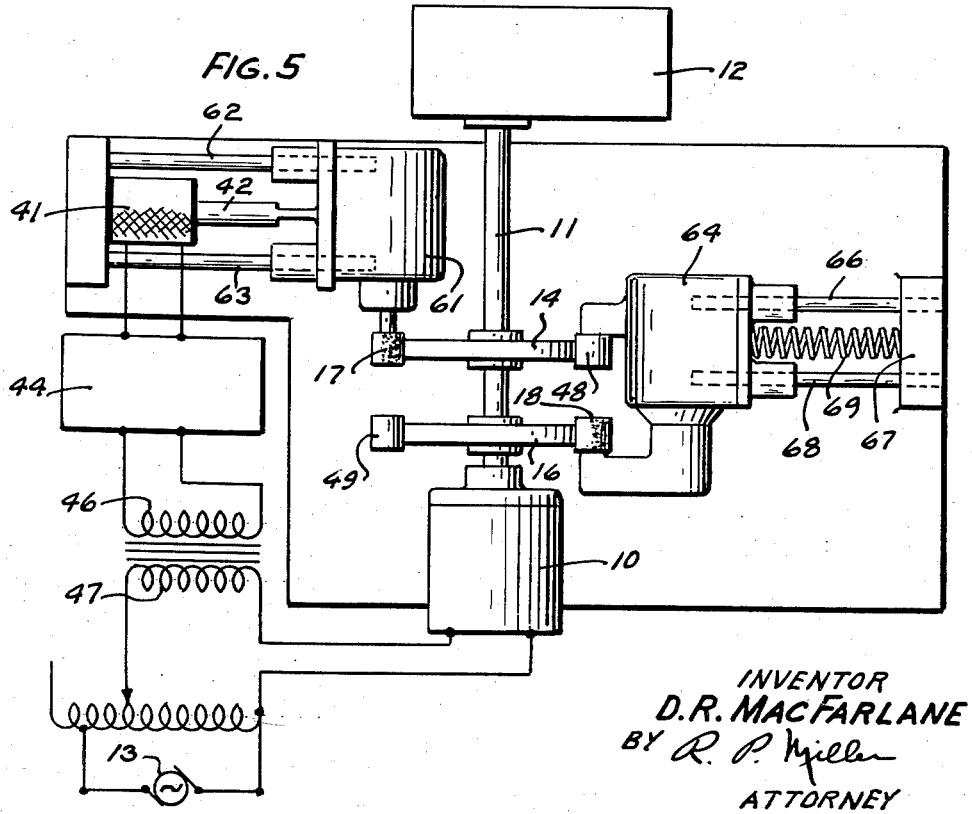
INVENTOR
D. R. MACFARLANE
BY R. P. Miller
ATTORNEY

United States Patent Office 2,968,896
Patented Jan. 24, 1961

2,968,896

METHOD AND APPARATUS FOR GRINDING CAMS

Donald R. MacFarlane, Indianapolis, Ind., assignor to Western Electric Company, Incorporated, New York, N.Y., a corporation of New York Filed Mar. 9, 1959, Ser. No. 798,258

12 Claims. (Cl. 51—105)

This invention relates to a method and apparatus for grinding cams, and more particularly to a method and apparatus for grinding compensating cams in accordance with a variable load placed on an electric motor.

In operation of electric motors, it is often of critical importance that the motor current be maintained at a constant level at all times. When a motor is used to drive a variable load, e.g. a fabricating machine, a washing machine, etc., the motor will draw a variable amount of current in order to impart a constant speed of rotation to the motor shaft. This variable or surging current results in variation of the output power, thus subjecting not only the motor but also the drive mechanism to deleterious forces. In order to alleviate this condition, motors have been provided with compensating cam mechanisms that impart a variable drag on the motor during operation. These compensating cams apply a mechanical drag on the motor during that portion of a cycle of rotation where the power requirements are low, and a reduced drag or aiding force when the power requirements are high. In addition, the use of such compensating cams to eliminate peak power requirement conditions permits the use of smaller motors.

An object of this invention resides in a new and improved method and apparatus for grinding cams.

Another object of this invention is the provision of an economic method and apparatus for grinding cams in accordance with a varying electrical or other condition.

A further object of the invention resides in a method and apparatus for simultaneously grinding a plurality of compensating cams for a motor in accordance with the power requirements placed on the motor.

An additional object of the invention is to provide a method and apparatus for grinding one cam in accordance with a varying condition and simultaneously grinding a second cam in accordance with the ground contour of the first cam and then utilizing the second cam to modulate the varying condition until said varying condition becomes a uniform condition.

With these and other objects in view, the present invention contemplates a method and apparatus for simultaneously grinding a pair of cam blanks in accordance with a variable load condition placed on an electric motor. As the motor drives the variable load, the motor will draw a correspondingly varying amount of current which is detected and utilized to control a solenoid, torque motor or other suitable device to move a first grinding device toward a first of the cam blanks to be ground. A second grinding device is mechanically positioned in accordance with the cam surface ground on the first cam blank and this second grinding device grinds the second cam blank. A spring-urged cam follower engages the second ground cam blank to impart a variable force on the motor to compensate for the variable load. The grinding of the cam blanks continues until the motor current is modulated to a constant level, whereafter the grinding tools are rendered ineffective to further grind the cam blanks.

Other objects and advantages of the present invention will be apparent from the following detailed description when considered in conjunction with the accompanying drawings, wherein Fig. 1 is a top plan view of a grinding machine for grinding compensating motor cams embodying the principal aspects of the present invention;

Fig. 3 is a partial sectional view taken along the line 3—3 of Fig. 1 depicting a grinding tool for grinding a first of a pair of cams in accordance with a varying electrical condition;

Fig. 4 is a partial sectional view taken along the line 4—4 of Fig. 1 depicting a grinding tool for grinding a second of a pair of cams in accordance with the contour of the first ground cam, and Fig. 5 is a top plan view of a modified cam grinding apparatus for simultaneously grinding a pair of cams in accordance with a varying electrical condition.

Figure 1:
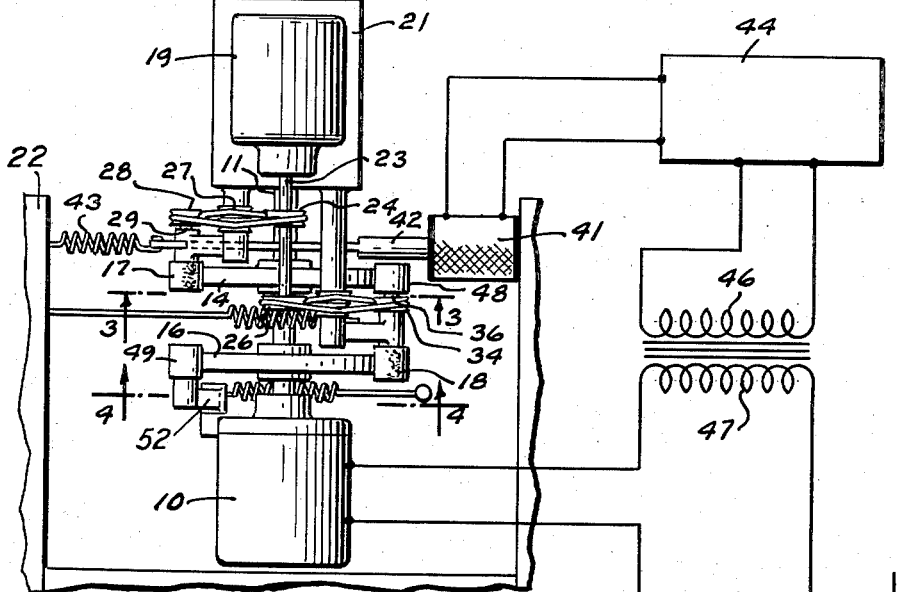

Referring first to Fig. 1, there is shown a motor 10 that rotates a shaft 11 to drive a machine 12 having a variable load characteristic. The machine 12 may be a washing machine, a cutting machine or other fabricating machines which during each cycle of rotation of the shaft 11 impart a varying load to the shaft. The motor 10, in order to maintain constant the speed of rotation of the shaft 11, draws a variable amount of current from a source 13. The motor operating under such conditions impresses detrimental stresses and strains on the drive mechanism and on the motor itself. This variable load characteristic can be compensated by the provision of a compensating cam that has a contour which aids the motor when subjected to heavy loads and places an additional load on the motor when the motor is subjected to small loads.

Figure 2:
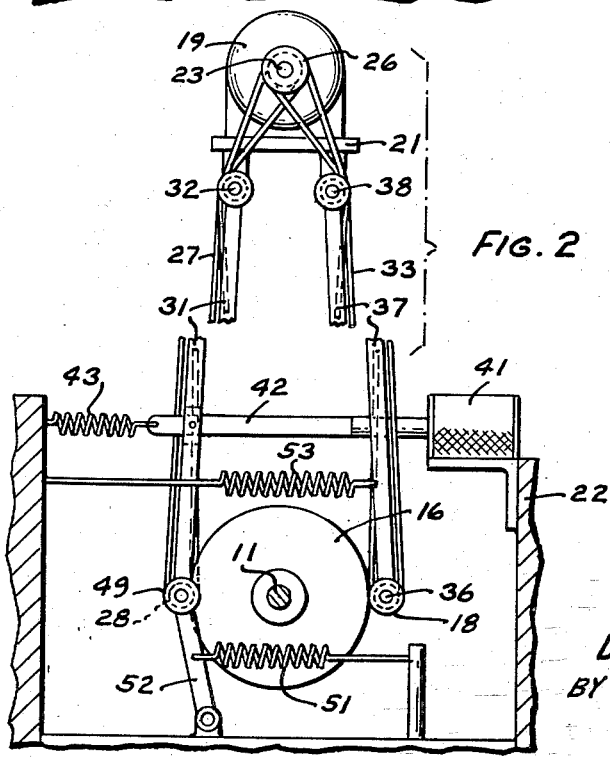
Fig. 2 is a side elevational view of the cam grinding machine shown in Fig. 1, with portions thereof omitted for clarity, particularly illustrating a drive mechanism for a pair of grinding tools.

In order to produce such a cam, a pair of cam blanks 14 and 16 are mounted on the shaft 11. The cam blanks are adapted to be ground by a pair of grinding wheels or cutters 17 and 18 driven by a motor 19 mounted on a platform 21 supported by means (not shown) attached to a base or frame 22. The motor 19 drives a shaft 23 having a pair of pulleys 24 and 26 mounted thereon. Pulley 24 drives a belt 27 to rotate a pulley 28 (see Figs. 2 and 3). Pulley 28 is connected to the grinding wheel 17 by a shaft 29 passing through a lever 31 pivotally mounted on a stud shaft 32. In a like manner the pulley 26 drives a belt 33 to rotate a pulley 34 mounted on a shaft 36. The shaft 36 is connected to the grinding wheel 18 and is mounted within a lever 37 pivotally attached to a stud shaft 38.

The grinding of the cam blank 14 is controlled by selectively positioning the grinding wheel 17 is accordance with the energization of a solenoid 41. It is to be understood, however, that other suitable devices may be utilized to selectively position the grinding wheel 17, such as, a torque motor, a valve controlled pneumatic or hydraulic apparatus, etc. Solenoid 41 selectively positions an armature 42 connected to the pivotally mounted lever 31. Opposing the action of the solenoid 41 is a tension spring 43 interconnected between the base 22 and the lever 31. The solenoid 41 or other device is energized or actuated by an amplifier circuit, generally designated by the reference numeral 44, which in turn is controlled by a pickup coil 46 associated with a coil 47 included in the energizing circuit for the motor 10.

The position of the grinding wheel 18 is controlled by a cam follower 48 mounted on the shaft 36 and positioned to engage the cam blank 14. A cam follower 49 is positioned diametrically opposite to the grinding wheel 18 and is urged into engagement with the cam blank 16 by a tension spring 51 connected to a lever 52 that provides a mounting for the cam follower 49 (see Fig. 4).

In operation of the grinding mechanism, the shaft 11 of the motor 10 is connected to drive a machine 12 having variable load characteristics. A pair of cam blanks 14 and 16 are mounted on the shaft 11, and the motor 10 is initiated into operation. As the load produced by the machine 12 increases, corresponding increases in current are drawn from the source 13. The increased current flow through the coil 47 is picked up by the coil 46 and applied to the amplifier 44 which functions to energize the solenoid 41. This solenoid moves the armature 42 against the action of the spring 43 to move the rotating grinding wheel 17 into engagement with the cam blank 14. As the load imparted by the machine 12 decreases, the energization of the solenoid 41 will correspondingly decrease, thereby permitting the armature 42 to move under the urging of the spring 43. The grinding wheel 17 thus moves from engagement with the cam blank 14.

When the ground section of the cam blank 14 is presented to the follower 48, a tension spring 53 moves the lever 37 inwardly to move the rotating grinding wheel 18 into engagement with the cam blank 16. When the ground section of the cam blank 16 is presented to the follower 49, the spring 51 will move the follower against the ground section to impart a force to aid the rotation of the shaft 11. It may be thus appreciated that when the ground section of the cam blank 16 is presented to the follower 49, the machine 12 is imparting the maximum load on the motor 10, and the spring-urged follower 49 is acting to aid the rotation of the shaft 11.

When the machine 12 imparts a relatively light load on the motor 10, the energization of the solenoid 41 is reduced, and as a result, the grinding wheel 17 does not cut into the cam blank 14. In such a situation, when the unground section is presented to the cam follower 48, the cam follower is maintained stationary and the grinding wheel 18 is ineffective to cut the cam blank 16. When the cam follower 49 under the urging of the spring 51 engages the unground portion of the cam blank 16, a maximum drag is imparted on the cam blank causing the motor 10 to draw the same amount of current as though the machine 12 was imparting a maximum load.

During each rotation of the shaft 11, the grinding wheel 17 will grind out a small portion of the cam blank 14, and when this ground section is presented to the follower 48, the grinding wheel 18 will grind a small section of the cam blank 16. The grinding operations continue until such time that there are no fluctuations in the current drawn by the motor 10 from the source 13. At this time the amplifier 44 will cease energizing the solenoid 41, and the grinding wheel 17 will be withheld from the cam blank 14. The cam blank 16 acting on the cam follower 49 causes said cam follower to impart a drag on the cam blank which varies in accordance with the load produced by the machine 12. The cam blanks 14 and 16 can now be withdrawn from the shaft 11 and connected to other motors that drive machines having load characteristics identical to the load characteristics of the machine 12.

Referring now to Fig. 5 wherein a modified variation of the cam grinding apparatus is shown, and identical reference numerals are utilized in this figure to designate like parts existing in Figs. 1–4. The grinding wheel 17 in this instance is driven by a motor 61 slidably mounted on guide rods 62 and 63. The armature 42 of the solenoid 41 is connected to the housing of the motor 61 and accordingly positions the motor 61 and the grinding wheel 17 in accordance with the energization of the solenoid 41. The cam follower 48 is rotatably mounted to a housing of a motor 64 which in turn is adapted to drive the grinding wheel 18. The housing of the motor 64 is mounted on a pair of guide rods 66 and 68. A compression spring 69 interposed between an abutment 67 and the motor 64 continuously exerts a force on the motor 64 that urges the cam follower 48 into engagement with a cam blank 14. Each movement of the cam follower 48 causes the grinding wheel 18 to move into position to grind the cam blank 16. Again the spring-urged cam follower 49 engages the ground cam blank 16 to impart a variable load in accordance with the contour of the ground cam blank.

It will be noted that by utilizing the apparatus shown in Figs. 1–4 or the apparatus shown in Fig. 5, a method is provided for grinding a cam blank in accordance with a variable load placed on an electric motor. The method contemplates grinding a first cam blank 14 in accordance with a variable current drawn by the motor 10 and then utilizing the ground cam blank 14 to control the grinding of a second cam blank 16. This second cam blank 16 is employed to selectively position the cam follower 49, which in turn imparts a variable drag on the motor shaft 11. The grinding of the cams 14 and 16 continues until such time that the drag imparted by the cam follower 49 compensates for the variable load 12. At this time current drawn by the motor 10 is modulated to remove all fluctuations, and a constant current is drawn.

It is to be understood that the above-described methods and arrangements of apparatus and construction of elemental parts are simply illustrative of an application of the principles of the invention and many other modifications may be made without departing from the invention.

What is claimed is:

1. A method of cutting a cam to compensate for a varying condition, which comprises cutting a cam blank in accordance with said varying condition, and, simultaneously with the cutting of the cam blank, continuously modulating said varying condition in accordance with the instantaneous contour of the cut cam blank so that, as the cutting of the cam blank progresses, the variation in the condition approaches zero.

2. A method of grinding a compensating cam for an electric motor subjected to a varying load, which comprises detecting variations in current drawn by the motor, moving a grinding wheel into and from engagement with a cam blank in accordance with the detected variations in current, and impressing a compensating load on the motor in accordance with the contour of the ground cam blank.

3. A method of grinding a pair of cams in accordance with a varying condition, which comprises grinding a first cam in accordance with said varying condition, simultaneously grinding a second cam in accordance with the ground contour of said first cam, and continuously modulating during the grinding of the cams the varying condition in accordance with the instantaneous contour of the second cam until the contours of the cams are identical and the condition is no longer varying.

4. A method of grinding a cam in accordance with a varying electrical condition, which comprises moving a grinding tool toward and away from a cam blank in accordance with variations in said electrical condition, grinding a second cam in accordance with the ground contour of the first cam, and varying the electrical condition in accordance with the contour of the second cam until said electrical condition is no longer varying.

5. A method of grinding a pair of cams in accordance with a varying load placed on an electric motor, which comprises measuring the current drawn by the motor while driving the load, grinding a first cam driven by the motor in accordance with the measured current, grinding a second cam driven by the motor in accordance with the contour of the first cam, and impressing a load on said second cam to modulate the variations in the total load placed on the motor.

6. An apparatus for cutting a cam in accordance with a varying condition, which comprises means for rotating a cam blank, a cutting device mounted for movement toward and away from the cam blank, means responsive to the varying condition for accordingly moving said cutting device, and means responsive to the instantaneous contour of said cam blank being cut for modulating said varying condition so that, as the cutting of the cam blank progresses, the variation in the condition approaches zero.

7. An apparatus for grinding a cam in accordance with the current drawn by an energizing circuit of an electric motor, which comprises a shaft driven by the motor for mounting a cam blank, a grinding device mounted for movement toward and away from said cam blank, means for moving said grinding device, and means responsive to variations in the energizing current for accordingly operating said grinding device moving means.

8. An apparatus for grinding a compensating cam for an electric motor subjected to a varying load, which comprises a grinding wheel mounted for movement toward and away from a cam blank, means connected to said motor for rotating said cam blank, a detector means for ascertaining the current drawn by said motor, means operated by said detector means for moving said grinding wheel toward and away from said cam blank, and means actuated in accordance with the ground contour of said cam for modulating the current drawn by said motor.

9. An apparatus for simultaneously grinding a pair of cams in accordance with a varying condition, which comprises a first movably mounted grinding tool, means responsive to said varying condition for moving said grinding tool toward and away from a first cam blank, a second movably mounted grinding tool, means responsive to variations in the contour of the first ground cam blank for accordingly moving the second grinding tool to grind a second cam blank, and means actuated in accordance with the contour of the second cam blank for modulating said varying condition.

10. An apparatus for grinding a pair of cam blanks in accordance with a varying electrical condition, which comprises a first movably mounted grinding tool for grinding a first of said cam blanks, a second movably mounted grinding tool for grinding a second of said cam blanks, a solenoid connected to move said first grinding tool, means responsive to said varying electrical condition for accordingly energizing said solenoid to move the first grinding tool toward and away from said cam blank, a follower mechanism operated in accordance with the contour of the ground first cam blank for moving the second grinding tool toward and away from the second cam blank, and means responsive to the contour ground on the second cam blank for modulating said varying condition.

11. An apparatus for grinding a pair of cam blanks in accordance with a varying load placed on an electric motor, which comprises a shaft connected to said motor for mounting said pair of cam blanks, a frame, a first grinding tool pivotally mounted on said frame for grinding a first of said cam blanks, a second grinding tool pivotally mounted on said frame for grinding a second of said cam blanks, means responsive to variations in the load for pivoting the first grinding tool toward and away from said first cam blank, a cam follower mechanism positioned in accordance with the ground contour of the first cam blank for pivoting the second grinding tool toward and away from the second cam blank, and a spring-loaded follower mechanism positioned in accordance with the ground contour of the second cam for modulating the variations in the load placed on the motor.

12. An apparatus for grinding a pair of cam blanks in accordance with a varying load placed on an electric motor, which comprises a shaft driven by said electric motor for mounting said pair of cam blanks thereon, a frame, a first grinding tool slidably mounted on the frame for grinding a first of said cam blanks, a second grinding tool slidably mounted on the frame for grinding a second of said cam blanks, means responsive to variations in said load for reciprocating said first tool to grind said first cam blank, means positioned in accordance with the ground contour of the first cam blank for reciprocating said second tool to grind said second blank, and means for imparting a load on said second ground cam blank to compensate for variations in the load placed on said motor.

References Cited in the file of this patent
UNITED STATES PATENTS

| | | |
|---|---|---|
| 1,231,920 | Lumsden | July 3, 1917 |
| 2,735,237 | Balsiger | Feb. 21, 1956 |